United States Patent
Le et al.

(10) Patent No.: US 6,744,730 B2
(45) Date of Patent: Jun. 1, 2004

(54) THROUGHPUT ENHANCEMENT AFTER INTERRUPTION

(75) Inventors: Khiem Le, Coppell, TX (US); Yogesh Swami, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/001,216

(22) Filed: Nov. 30, 2001

(65) Prior Publication Data

US 2003/0103452 A1 Jun. 5, 2003

(51) Int. Cl.[7] ............................................. G01R 31/08
(52) U.S. Cl. ........................................ 370/229; 370/235
(58) Field of Search ................................ 370/229, 235, 370/310.2, 329, 338, 437, 468, 352, 353, 354, 356, 392, 395.2, 395.52; 709/224, 235

(56) References Cited

U.S. PATENT DOCUMENTS

| | | | | |
|---|---|---|---|---|
| 5,974,028 A | * | 10/1999 | Ramakrishnan | 370/229 |
| 6,105,064 A | * | 8/2000 | Davis et al. | 709/224 |
| 6,205,120 B1 | | 3/2001 | Packer et al. | |
| 6,208,620 B1 | | 3/2001 | Sen et al. | 370/231 |
| 6,219,713 B1 | * | 4/2001 | Ruutu et al. | 709/235 |
| 6,438,101 B1 | * | 8/2002 | Kalampoukas et al. | 370/229 |
| 6,493,316 B1 | * | 12/2002 | Chapman et al. | 370/231 |
| 2001/0049731 A1 | | 12/2001 | Kuusinen et al. | 709/223 |
| 2002/0097722 A1 | * | 7/2002 | Liao et al. | 370/392 |
| 2002/0150048 A1 | * | 10/2002 | Ha et al. | 370/231 |
| 2002/0163888 A1 | * | 11/2002 | Grinfeld | 370/235 |
| 2003/0063564 A1 | * | 4/2003 | Ha et al. | 370/230 |

FOREIGN PATENT DOCUMENTS

EP  1161036  12/2001  ......... G06F/15/173

OTHER PUBLICATIONS

"IWTCP Final Report", A. Gurtov et al, University of Helsinki Department of Computer Science, Oct. 24, 2000.
"Implementation and Performance Evaluation of Indirect TCP" A. Bakre et al, *IEEE Transactions on Computers*, vol. 46, No. 3, Mar. 1997, pp. 260–278.
RFC 2001, "TCP Slow Start, Congestion Avoidance, Fast Retransmit and Fast Recovery Algorithms", W. Stevens, Jan. 1997.
RFC 2581, "TCP Congestion Control", M. Allman et al, Apr. 1999.

* cited by examiner

*Primary Examiner*—Phirin Sam
(74) *Attorney, Agent, or Firm*—Ware, Fressola, Van Der Sluys & Adolphson, LLP (57) ABSTRACT

An accelerated slow-start enables fast recovery from a packet delay or loss condition or even from a deliberate suspension of service in an Internet connection in which a wireless link exists between a sending mobile host (30) and a receiving network host (40).

26 Claims, 5 Drawing Sheets

Data to Mobile, alternative A

FIG. 5

Data to Mobile, alternative B

Data to Mobile, alternative C

FIG. 7

Data to Mobile, alternative D

FIG. 8

Data to Mobile, alternative E

THROUGHPUT ENHANCEMENT AFTER INTERRUPTION

BACKGROUND OF INVENTION

1. Technical Field

The present invention relates to throughput optimization of Internet protocol (IP) based applications, such as transmission control protocol (TCP), over links such as cellular, where long interruptions of the application traffic can be caused by error bursts or system design.

2. Discussion of Related Art

Figure 1:
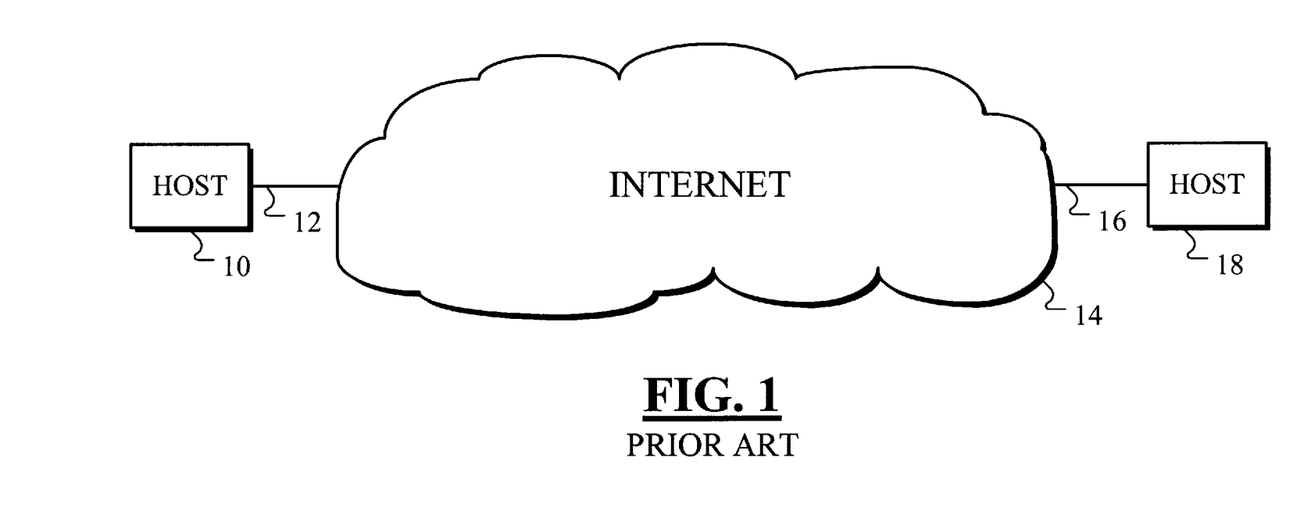
FIG. 1 shows a prior art connection between a sending and a receiving host through an Internet having a plurality of routers over which multiple datagrams may be transmitted over different paths, arriving at the receiving host in a different sequence from that sent.

As shown in FIG. 1, a sending host provides datagrams according to the Internet Protocol (IP) on a line 12 over an Internet 14 on a line 16 to a receiving host 18. Each of the hosts 10, 18, may be thought of as having protocol software on each machine stacked vertically into layers, each of which handles different functionalities in the communication of datagrams. The higher layers deal with end-to-end application issues while lower layers handle issues relating to transfer of packets or datagrams through the network. In traversing a network such as the Internet 14 shown in FIG. 1, the datagrams of a given message may traverse different routes through different routers from the host 10 to the host 18. The intermediate routers also have protocol stacks but the datagrams do not need to consult higher levels of the routers because only lower layers are needed to receive, route and send datagrams.

For instance, the host 10 may send a datagram which passes up to the IP layer on intermediate routers on the way to the receiving host 18 but no higher. Only when the datagram reaches the receiving host 18 does IP extract the message and pass it up to higher levels of the protocol software.

In practice, delays and loss may occur between the end point hosts 10, 18 due to congestion in the routers and other devices of the Internet 14 as well as lack of storage space in the receiving host 18. Even severe delays can be caused by an overload of datagrams at one or more switching points, routers, or the like. When this happens, delays increase as routers begin to pile up datagrams until they are able to send them forward. But since the storage capacity of each router is not unlimited and since datagrams compete for that storage space, it is possible in an uncoordinated network such as the Internet that the number of datagrams arriving at a congested router will be too much for it to handle and it will be forced to drop datagrams.

If that happens, the hosts 10, 18 would not normally know the details of where this congestion has occurred or why. To them, an unexpected delay or loss is a premonition for congestion. This attribution is due to the fact that in wired networks, for which the Internet was designed, the successful transmission of datagrams between hosts and routers and between routers is very reliable, and congestion is a good assumption as the cause of the delay and loss. For this reliable wired environment the Internet designers provided for certain responses to perceived congestion.

Figure 2:
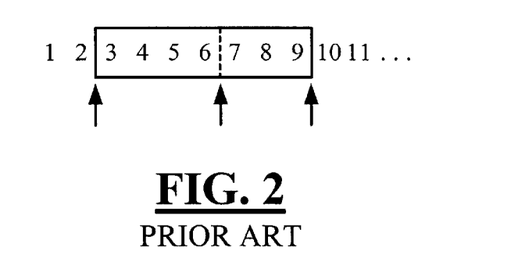
FIG. 2 shows a transmission control protocol (TCP) sliding window, according to the prior art.

One of these is for the TCP layer to use a specialized sliding window mechanism as shown in FIG. 2 that is used for several purposes. This window makes it possible to send multiple segments (the unit of transfer between TCP layers on two machines is called a segment) from the host 10 before an acknowledgement arrives, so as to increase total throughput. It also has a flow control purpose that allows the receiving host 18 to restrict transmission until it has sufficient buffer space to accommodate more data. The window operates at the octet level, not at the segment or datagram level (TCP segments are encapsulated within IP datagrams). Octets are numbered sequentially as shown in FIG. 2. Whenever a sending host sends a TCP segment it puts the sequence number of the first octet in that segment and in return expects an acknowledgement from the receiver for the last octet the receiver has successfully received. The sending host 10 keeps three pointers associated with every connection. The first pointer marks the left of the sliding window to separate octets on the left (1, 2) that have been sent and acknowledged from octets yet to be acknowledged. A second pointer marks the right of the sliding window and defines the highest octet (9) in the sequence that can be sent before more acknowledgements are received. The third pointer marks the boundary inside the window that separates those octets that have already been sent (3–6) from those octets that have not yet been sent (7–9). The receiving host 18 maintains a similar window to piece the stream together again after a plurality of datagrams traverse the Internet 14, possibly over different routes using different routers and arriving out-of-sequence.

TCP allows the window size to vary over time. It does that by having the receiving host 18 specify not only how many octets have been received but how many additional octets of data it is prepared to accept. This is carried out by a so-called window advertisement which can be thought of as specifying the receiving host's current buffer size. When the receiving host 18 causes an increase to its window advertisement, the sending host 10 increases the size of its sliding window. Likewise, when the receiving host 18 signals decreased buffer space with a decreased window advertisement, the sending host 10 decreases the size of its window and stops sending octets beyond the boundary. An advantage of all this is of course that it provides flow control as well as reliable transfer. If the receiving host 18 buffer begins to get full, it can send smaller window advertisements. It can even send a window size of zero to stop all transmissions. It can later advertise a non-zero window size to trigger the flow of data again once buffer space is available again.

In addition to flow control, TCP maintains a second limit, called the congestion window limit or congestion window to control congestion. The goal of the flow control window is to ensure that the sender does not send more data than what the receiver can actually accommodate. However, in many cases it is the networks which may not have enough space to accommodate all the data that the sender is sending. As alluded to before, in case of congestion the network buffer space may get exhausted and the data packets might get dropped. In addition, if there are a plurality of senders and if neither of them regulates the rate of data being sent the network will never be able to make room for any single connection, and the congestion may persist for a very long time. To avoid this, TCP uses a congestion window that tries to estimate the amount of buffer space available in the network. To summarize, TCP does not solely rely on the window advertised by the receiving host in deciding how many packets to send. It instead takes the minimum of the advertised window and the congestion window to decide how much data can be sent into the network without waiting for an acknowledgement from the receiver.

When TCP experiences datagram loss, it adopts two different strategies to adjust its congestion window. At the start of the connection when the TCP has no information about the state of the network, it begins by sending one packet into the network and waiting for an acknowledgement from the receiver. An acknowledgement implies that the network had sufficient space for at least one packet from this connection to accommodate. It then injects two new packets to see if the network can accommodate two packets and waits for the acknowledgement of these new packets. This process of probing the network for its buffer space, called slow-start, continues until the sender sees a packet loss. A packet loss indicates that the network has run out of its capacity to enqueue data at a rate higher than this and therefore the sender must not try to be too aggressive in sending more packets. However, since the buffer space in the network keeps changing (e.g., another TCP connection ended and the buffer was freed-up because of this), the sender still keeps trying to increase its congestion window for every acknowledgement received, but at a rate considerably slower than slow start.

Anytime during the slow start or congestion avoidance, if a packet is lost (but the sender is able to still receive some acknowledgements) the sender reduces its window by one half. In other words, TCP reduces the volume of traffic exponentially (as well as the rate of retransmission). This is called multiplicative decrease. However, if the sender does not receive any acknowledgements within a certain time period, that indicates that the network was very heavily congested and no packets were moving. Under these circumstances the TCP sender again enters slow start and increases its window by one segment for every acknowledgement received. This allows routers enough time to clear datagrams already in their buffers.

As the problem goes away, the sender will again reach an equilibrium state around which its congestion window will undulate. Whenever the traffic is suspended for a period of time more than the timeout period of the sender, the sender initiates the slow start algorithm where the congestion window is started at the size of a single segment and increased by one segment each time an acknowledgement arrives. When the acknowledgement to the initial segment arrives, TCP increases the congestion window to two, sends two segments and waits. When the two acknowledgements arrive, they each increase the congestion window by one, so TCP can send four segments. Acknowledgements for those will increase the congestion window to eight. Within four round-trip times, TCP can send sixteen segments, soon reaching a limit such as the receiver's advertised window, at which point the congestion window equals the advertised window and further increases cease, or another limit called the slow start threshold size. If the slow start threshold size is reached, the above described exponential increase is stopped and thereafter the increase is made linear. This is an additive increase, compared to slow-start's exponential increase. In other words, slow start dictates an exponential increase which ceases when the slow start threshold size is reached, after which congestion avoidance takes over.

Figure 3:
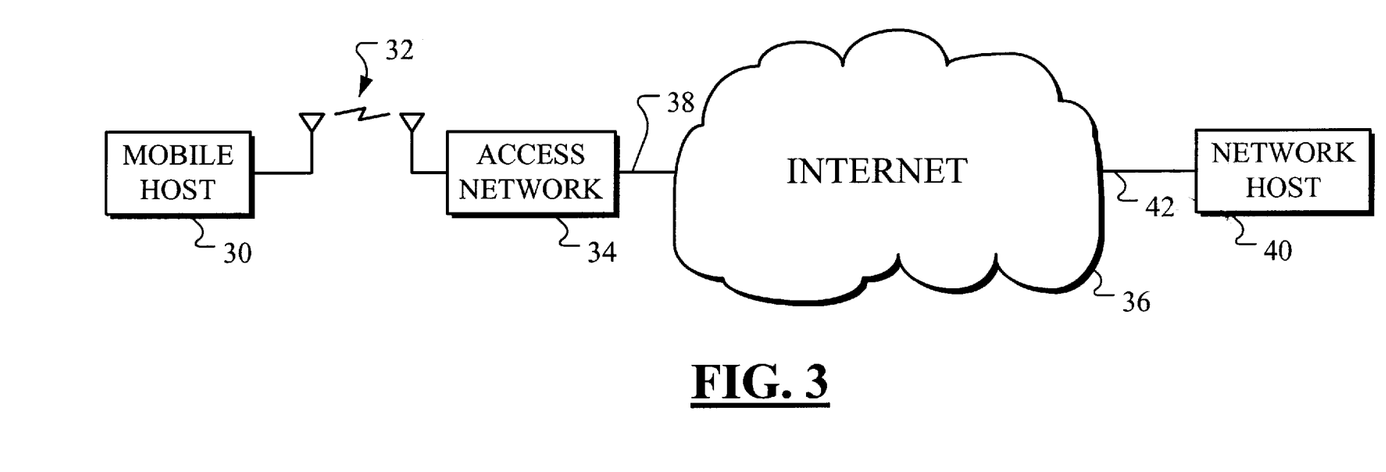
FIG. 3 shows a scenario similar to that shown in FIG. 1, except having a radio link as part of the communication between the sending host and the receiving host.

Slow start avoids swamping the Internet with additional traffic immediately after congestion clears, or when a new connection starts. However, the assumption of delays being caused by congestion may not always be correct. As shown in FIG. 3, a mobile host 30 is in communication over a radio link 32 with an access network 34 connected to an Internet 36 by a wired connection 38. The Internet 36 is populated with a plurality of routers, switches, and other devices similar to the situation explained above in connection with FIG. 1. A given packet may traverse the Internet 36 over a path which is different from other packets in the same message. Nonetheless, under ideal conditions, all of the packets of the message arrive at an intended recipient network host 40 on a wired line 42 emerging from the Internet 36. In a case such as shown in FIG. 3, the assumption made for wired networks (such as shown in FIG. 1) that all of the connections are highly reliable is not correct. The wireless link 32 is subjected to a much higher level of error than a wired connection, and the response to congestion designed into the TCP/internet protocol suite described above is not necessarily ideal. In case a lost datagram is due to a problem on the radio link 32 related to radio impairments, it would not be optimum for the mobile host to use the known slow-start recovery algorithm after a stoppage. Also not optimum would be a case of recovery after a deliberate suspension of service. Such might occur for instance in the GPRS suspend state described in European Patent publication number 1161036 entitled "Suspend State" of Kuusinen et al filed May 31, 2000 as EPA 01660087.6. This is a problem that needs to be solved to allow efficient deployment of packet-based services on mobile devices.

In the above-mentioned European Patent Publication No. 1161036, based on EPA 01660087.6 filed May 31, 2000, the problem of slow start caused by GPRS suspend was addressed wherein the inventors proposed a source quench method by advertising a null window.

In the IWTCP (TCP Performance over wireless links) Final Report by A. Gurtov et al published by the University of Helsinki Department of Computer Science, Oct. 24, 2000, it was proposed to use an accelerated slow start with k=2 to reach the congestion avoidance state faster. However, there will then be many packets lost at the end of the slow start. To attempt to address this problem, the authors have recommended using a smaller buffer size at the last hop router to avoid a large number of packet losses. But a reduced buffer would have a negative effect on the throughput in the congestion avoidance state.

There are proposals to split the original TCP connection into separate connections for the wired and wireless parts of the path. See "Implementation and Performance Evaluation of Indirect-TCP", by A. Bakre et al, *IEEE Transactions on Computers*, Vol. 46, No. 3, March 1997, pp. 260–78. On the wireless part, a protocol optimized for error recovery may be used. Drawbacks of that approach include violation of the end-to-end TCP semantics, since acknowledgements may reach the sender before the data reaches its destination, significant overhead caused by the back-to-back processing and considerable per-connection state maintenance.

SUMMARY OF INVENTION

An object of the present invention is to provide a solution to the above-mentioned problem of an inefficient slow-start procedure in a recovery following a non-congestion situation.

According to a first aspect of the present invention, a method, for increasing traffic from a sender to a receiver in a communications system after a period of packet delay or loss existing in a connection between said sender and said receiver by starting a congestion window at a size of a single segment and increasing the congestion window by one segment each time an acknowledgement arrives, is characterized by the sender accelerating the starting after a period of a detrimental radio conditions existing on a radio link of the connection concurrent with the period of packet delay or loss existing in the connection.

Further according to the first aspect of the invention, the method is characterized by the sender accelerating the starting by at least one of starting the congestion window at a first size greater than a single segment, and increasing the congestion window by a second size greater than a single segment each time an acknowledgement arrives.

Further still according to the first aspect of the invention, the method is characterized by ceasing the increasing the congestion window by the second size greater than a single segment upon the congestion window reaching a size equal to or greater than a slow start threshold size. A transition may then be made from the sender accelerating the starting to congestion avoidance procedure.

Further in accord with the first aspect of the invention, the method is characterized by the sender accelerating the starting after a period of deliberate suspension of service over the connection between the sender and the receiver.

Yet further in accord with the first aspect of the invention, the method is characterized by the receiver comprising a mobile host, and by signaling existence of the detrimental radio condition from the mobile host to the sender.

Yet further still in accord with the first aspect of the invention, the method is characterized by the receiver comprising a mobile host, and by signaling existence of the detrimental radio condition from a radio access network (RAN) to the sender. The term "radio access network" is used generically to include the third generation (3G) RAN, as well as network nodes or elements that are not classified as part of the 3G RAN. Examples are GPRS SGSN or GGSN.

Further still according to the first aspect of the invention, the method is characterized by the receiver comprising a mobile host, by signaling existence of detrimental radio conditions from a radio access network to mobile host, and by signaling from the mobile host to the sender via the radio access network.

Yet further still according to the first aspect of the invention, the method is characterized by the sender accelerating the starting by increasing the congestion window by a size greater than a single segment each time an acknowledgement arrives and by dividing the congestion window by a factor upon a timeout or packet loss to obtain a reduced slow-start threshold indicative of a point at which a transition from the accelerating the startup to congestion avoidance is needed.

According to a second aspect of the invention, a sending device able to recover from a condition of packet delay or loss existing in a connection between the sending device and a receiver by starting a congestion window at a selected size and increasing the congestion window each time an acknowledgement arrives, is characterized by means for identifying a period of a detrimental radio condition existing on a radio link of the connection, and by means for accelerating the starting after a period of the detrimental radio condition existing on the radio link of the connection concurrent with the period of packet delay or loss existing in the connection.

Further still according to the second aspect of the invention, the means for accelerating the slow start is characterized by a means for ceasing the increasing the congestion window by the second size greater than a single segment upon the congestion window reaching a size equal to or greater than a slow start threshold size.

Still further according to the second aspect of the invention, the means for accelerating the slow start is characterized by a means for transitioning from the sender accelerating the starting to a congestion avoidance procedure.

Further in accord with the second aspect of the invention, the sending device is characterized by the means for accelerating the starting after a period of deliberate suspension of service over the connection between the sending device and the receiver.

Still further in accord with the second aspect of the invention, the sending device is characterized by the receiver comprising a mobile host, and by the mobile host signaling the sending means the existence of the detrimental radio conditions.

Further still in accord with the second aspect of the invention, the sending device is characterized by the receiver comprising a mobile host, and by the existence of the detrimental radio conditions signaled from a radio access network to the sending device.

Yet further still in accord with the second aspect of the invention, the sending device is characterized by the receiver comprising a mobile host, by signaling existence of the detrimental radio conditions from a radio access network to the mobile host, and by signaling from the mobile host to the sending device via the radio access network.

In still further accord with the second aspect of the invention, the sending device is characterized by said receiver comprising a mobile host, by existence of the detrimental radio conditions signaled from a radio access network to the mobile host, and by the existence of the detrimental radio conditions signaled from the mobile host to the sending device via the radio access network.

Further still according to the second aspect of the invention, the sending device is characterized by means for the sender to accelerate the starting by increasing the congestion window by a size greater than a single segment each time an acknowledgement arrives and by means for dividing the congestion window by a factor upon timeout or packet loss to obtain a reduced slow start threshold indicative of a point at which a transition from the accelerating the starting to congestion avoidance is needed.

According to a third aspect of the invention, a communications system comprising a plurality of hosts able to communicate with datagrams sent via a network in between the hosts, wherein a sending host increases traffic to a receiving host after a period of packet delay or loss existing in a connection between the sending host and the receiving host by starting a congestion window at a selected size and increasing the congestion window each time an acknowledgement arrives from the receiving host is characterized by the sending host having means for accelerating the starting after a period of detrimental radio conditions existing on a radio link of the connection concurrent with the period of packet delay or loss in the connection.

Further according to the third aspect of the invention, the system is characterized by the sending host accelerating the starting after a period of deliberate suspension of service over the connection between the sending host and the receiving host.

Still further according to the third aspect of the invention, the system is characterized by the receiving host comprising a mobile host, and by means for signaling existence of the detrimental radio conditions from the mobile host to the sending host.

Further still according to the third aspect of the invention, the system is characterized by the receiving host comprising a mobile host, and by means for signaling existence of the detrimental radio conditions from a radio access network to the sending host.

Yet further still according to the third aspect of the invention, the system is characterized by the receiving host comprising a mobile host, and by means for signaling existence of the detrimental radio conditions from a radio access network to the mobile host, and by means for signaling from the mobile host to the sending host via the radio access network.

The invention helps the TCP sender increase its data rate faster in slow-start when it is known that radio conditions or a design suspension and non-network congestion caused the sender to go to slow-start. Since the congestion avoidance state is much more optimal for the throughput in slow-start, overall TCP throughput is improved.

Specifically, the TCP sender, upon notification that radio conditions (such as link losses or GPRS suspend) caused the interruption, leading to slow-start, will perform an accelerated slow-start instead of a regular slow-start. In the accelerated slow-start, for instance, the window is increased by k at every acknowledgement received, with k>1. In addition, when there is a packet loss during slow start, the slow start threshold is recalculated in that it is set equal to the congestion window divided by L. L is suggested to be (k+1) and not two, as in the case of regular slow start. However, other values of L are possible. During the congestion avoidance phase, however, the window is still reduced by half irrespective of the mechanism used during slow start. Otherwise, the TCP sender performs regular slow-start, i.e., increasing the congestion window by one for every acknowledgement. Regular slow-start is also performed at the beginning of the TCP connection.

The present invention preserves the cautious probing of TCP slow-start when slow-start is caused by network congestion, but speeds up the transition from slow-start to the above-described congestion avoidance (multiplicative decrease) when slow-start is caused by radio conditions (link losses or GPRS suspend, for instance). No change is required at the TCP receiver, and interoperability is fully preserved. No state maintenance is needed in the network, and the end-to-end semantics of TCP is preserved. The principle is broadly applicable to various access networks, including EDGE, CDMA 2000 and WCDMA.

Although there is the disadvantage of needing to implement and accelerate a slow-start at the TCP sender, which is a new requirement compared to standard TCP, the fact that there is no other change required in the Internet or in the receiving host is a small cost to pay for the increased efficiency and the solution to the problem presented above. There is a very slight risk that the network congestion could occur shortly after the radio condition leading to slow-start. In that case, accelerated slow-start may not be as optimal as regular slow-start, but the negative effect on network congestion is mitigated, since there is still a gradual and cautious increase in the data rate during accelerated slow-start. Furthermore, the chance of network congestion happening at roughly the same time as detrimental radio conditions is small.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 4:
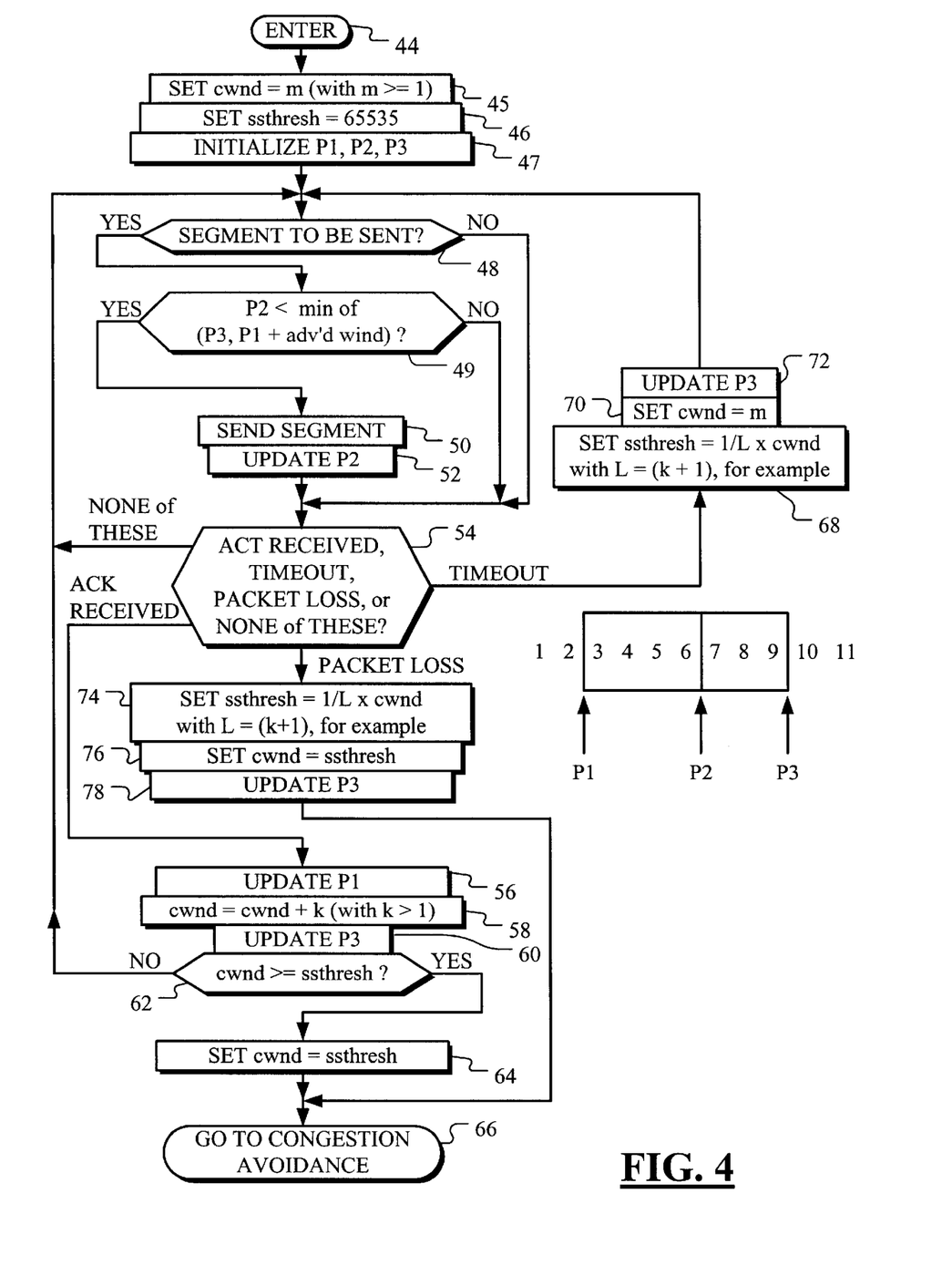
FIG. 4 shows an accelerated slow-start procedure to respond to datagram loss over the radio link of FIG. 3, as opposed to congestion, as assumed on the connection of FIG. 1.
Figure 5:
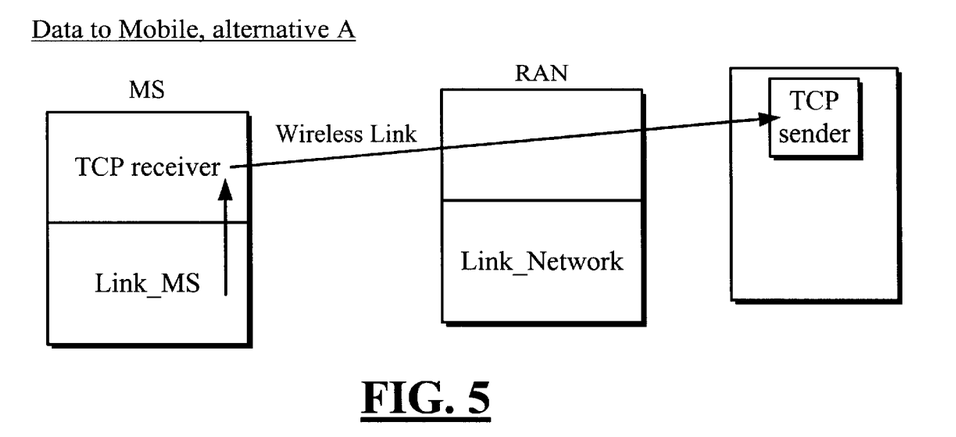
FIG. 5 shows a data to mobile, alternative A, according to the present invention.

Referring now to FIG. 4, an illustration of an algorithm is presented to show one way to carry out an accelerated slow-start procedure according to the present invention. It should be realized that the algorithm shown in FIG. 4 is to be executed instead of executing the known TCP slow-start procedure of RFC 2001 by W. Stevens, January 1997. According to the invention, when TCP receives notification from, for example, the link layer that a detrimental radio condition exists and packet loss or delay (that would have been interpreted by the prior art TCP as caused by network congestion) is instead caused by such a detrimental radio condition, an accelerated slow start is performed. It should be realized, however, that the known TCP slow-start procedure is to normally be run, except for a case where such notification is received of a detrimental radio condition. In the special case of a detrimental radio condition or conditions causing packet loss or delay, the algorithm of FIG. 4 is to be executed instead of the known TCP slow-start procedure, according to the invention.

After entering in a step 44, a step 45 is executed to set the size of the congestion window (cwnd) to a constant m, where m>1. A step 46 is then executed to set a slow start threshold (ssthresh) to a high value such as 65535 bytes as per RFC 2001. A step 47 is then executed to initialize pointers P1, P2 and P3, which correspond to the left of the sliding window (P1), the boundary inside the window that separates sent octets (3–6) from octets (7–9) not yet sent (P2), and the right of the sliding window (P3) marking the highest octet (9) that can be sent before more acknowledgements are received.

A step 48 is then executed in which a determination is made as to whether a segment is to be sent or not. If so, a determination is made in a step 49 is pointer P2 is less than the minimum of pointer P3 and pointer P1 plus the advertised window (P1+adv'd wind). The sender can transmit up to the minimum of the congestion window and the advertised window. If an affirmative determination is made in the step 49, a step 50 is executed to send a segment. P2 is then updated in a step 52. A decision step 54 is then executed. If a determination had been made in the step 48 that no segment was to be sent, or if a determination had been made in the step 49 that P2 was not less than the minimum of P3 and P1 plus the advertised window, then steps 50 and 52 would have been skipped, and decision step 54 executed directly.

In any event, step 54 makes a four-fold determination as to whether an acknowledgement has been received, whether there has been a timeout, whether there has been a packet loss, or none of these. If none of these have occurred, the steps 48 et seq are repeated, eventually leading to another repetition of step 54.

If step 54 determines that an acknowledgement has been received, a step 56 is executed to update pointer P1 (demarcating sent from unsent octets). A step 58 is then executed to increase the current value of the congestion window by a constant k, where k>1, according to the present invention. A step 60 is then executed to update the pointer P3 (demarcating the highest octet that can be sent), followed by execution of a step 62 to determine whether or not the congestion window is currently greater than or equal to the slow-start threshold. If not, the steps 48 et seq are re-executed. If so, the congestion window is set equal to the slow-start threshold in a step 64, and a transition is made to congestion avoidance.

Referring back to step 54, if it is determined that a timeout occurred, a step 68 is executed to set the slow-start threshold equal to a value of one divided by L times the congestion window, where a suggested value of L is k+1, according to the present invention. The rationale for dividing the window by L is that it corresponds to backtracking by one step, where no packet was lost. A step 70 is then executed to set the congestion window equal to the constant m, followed by execution of a step 72 to update the pointer P3. The steps 48 et seq are then re-executed.

If, on the other hand, it is determined in the step 54 that a packet loss has occurred, a step 74 is executed to set the slow-start threshold equal to one divided by L times the congestion window, with L=k+1, according to the present invention, for example. A step 76 is then executed to set the congestion window equal to the slow-start threshold. The pointer P3 is then updated in a step 78 and a transition is made to congestion avoidance in the step 66.

Figure 7:
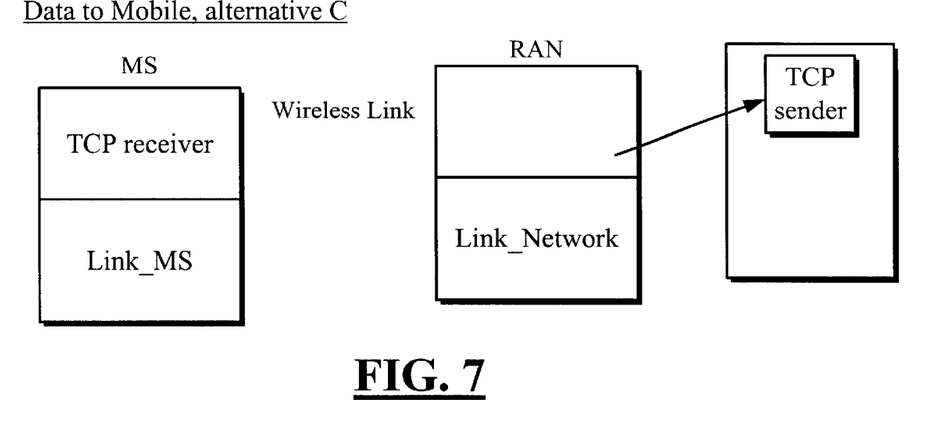
FIG. 7 shows a data to mobile, alternative C, according to the present invention.
Figure 8:
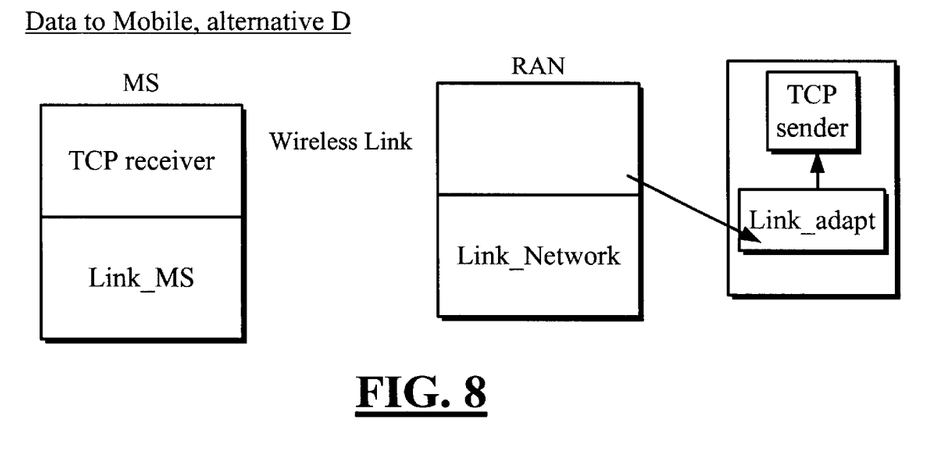
FIG. 8 shows a data to mobile, alternative D, according to the present invention.
Figure 9:
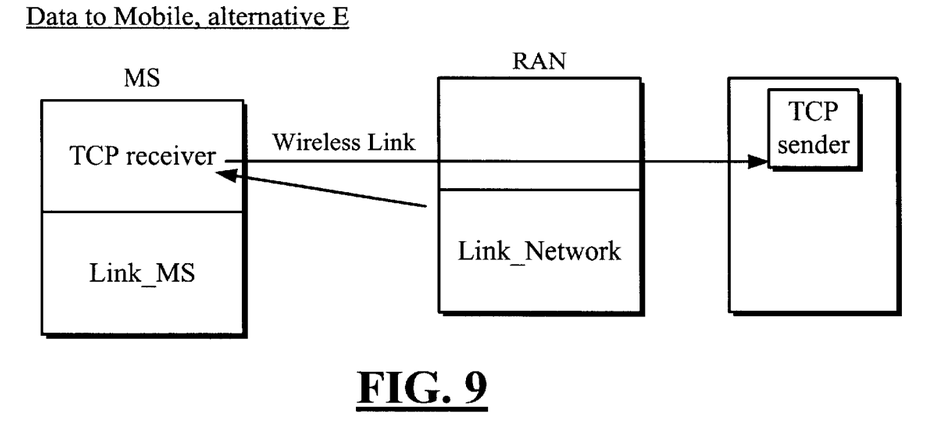
FIG. 9 shows a data to mobile, alternative E, according to the present invention.

Up until now, the foregoing descriptions have not focused on whether data is being transmitted from a mobile host 30 to a network host 40 or vice versa, such as shown in FIG. 3. However, it should be realized that provision must be made for data transfer in both directions. In other words, connections provided by the TCP/IP stream service allow concurrent transfer in both directions, i.e., a full duplex connection. From the point of view of an application process, two independent streams are flowing in opposite directions with no apparent interaction. Flow may be terminated in one direction while data continues to flow in the other direction, making it a half-duplex connection. In full duplex, there is the advantage that control information for one stream can be piggy-backed back to the source in datagrams carrying data in the opposite direction and network traffic is reduced. In the context of the present invention, the changes proposed can be implemented in a proprietary manner within the mobile host or mobile station (MS) itself if the data transfer were restricted from the mobile host 30 being the sender and the network host 40 being the receiver only. However, this is not a practical solution because there will be a need for data being sent in the opposite direction. Hence, there is the possibility of a need for standardization and/or nonproprietary solutions. This will now be described in connection with the alternatives of FIGS. 7–9 shown below.

In the FIGS. 5–9, various signaling alternatives for the case of "data to mobile" are considered. The acronym RAN in the figures refers to a Radio Access Network. Note that the present invention is applicable to cases where the RAN is not present or where the functions are allocated differently (e.g., notification not done by RAN, but by some other entity, such as GPRS SGSN). The Link_MS and Link_network shown in the FIGS. 5–9 are respectively the link level at the mobile station (MS) and the network side. Although TCP is used as an example, it should be understood that the invention is applicable to other application protocols having characteristics similar to TCP.

In all of the examples shown in FIGS. 5–9, the TCP sender is notified that one or more detrimental radio conditions are disrupting traffic (e.g., error bursts, GPRS suspend, or the like). This is in counterdistinction to the assumptions previously made by the designers of TCP that traffic disruptions are due to congestion. Thus, it will be understood that a positive indication is needed by way of notification to the TCP sender that radio conditions are detrimental and are the cause of traffic disruptions being experienced concurrently. The TCP sender then determines the value of k such as will be used in the algorithm shown in FIG. 4 or some similar algorithm. This can be done in various ways. The value of k can be standardized. The TCP sender can use its own algorithm and pick its own value of k. The value of k could be given to the TCP sender, along with the notification. The value of k may for instance not be standardized, but have been previously agreed upon, through negotiation or pre-configuration. The TCP sender then uses the value of k in accelerated slow start, according to the present invention, such as shown in the algorithm of FIG. 4 or similar. If the TCP sender is not notified of disrupting radio conditions, it uses the regular slow start already incorporated in the TCP/IP recommendations.

As will be evident by consulting the alternatives of FIGS. 5–9, to be described below, in the case of data to mobile, different alternatives exist on how the TCP sender is notified of radio conditions. For instance, referring to FIG. 5, the link layer (Link-MS) of the mobile station (MS) may notify the TCP receiver at the TCP layer of the MS which in turn notifies the TCP sender, as shown.

Figure 6:
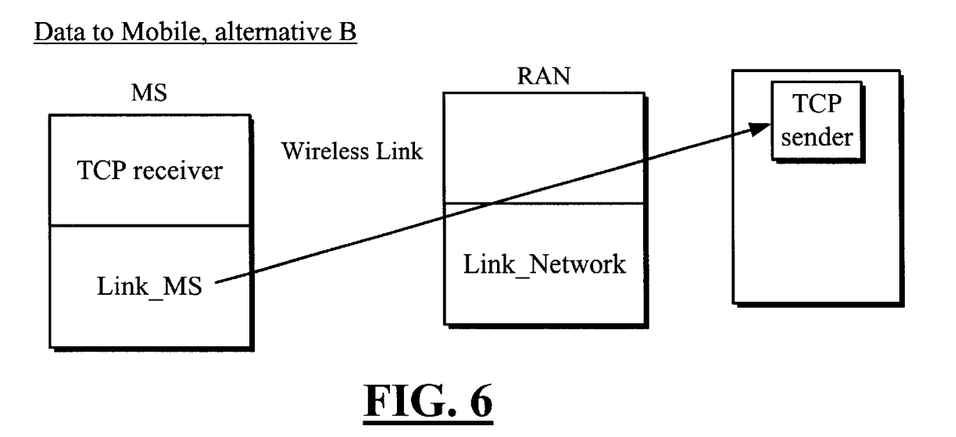
FIG. 6 shows a data to mobile, alternative B, according to the present invention.

In alternative B, as shown in FIG. 6, the link layer of the mobile station notifies the TCP sender directly.

In alternative C, as shown in FIG. 7, the radio access network (RAN) notifies the TCP sender directly.

In alternative D, as shown in FIG. 8, the radio access network (RAN) notifies the link adaptation layer (Link-adapt), which in turn notifies the TCP sender. In this case, Link_adapt is co-located with the TCP sender.

In alternative E, as shown in FIG. 9, the radio access network (RAN) notifies the TCP receiver, which in turn notifies the TCP sender.

In the case of data from mobile, the interacting entities are all co-located within the mobile station. Therefore, this invention can be implemented on a proprietary basis for the case of data from mobile. In the case of alternatives C and D as shown in FIGS. 7 and 8, the notifying entity for GPRS suspend could be SGSN. In alternatives A, B, C and E, as shown in FIGS. 5, 6, 7 and 9, the TCP sender can be notified through some TCP extension. In alternative D as shown in FIG. 8, some new protocol can be envisioned; no extension to TCP will be needed. In all cases, the TCP sender memorizes if the last slow start was accelerated or regular. If accelerated, when a loss is detected, the congestion window is divided by (k+1). In the case of a regular slow start, it is halved.

Therefore, it will be realized that for the data to mobile cases such as shown in FIGS. 5–9, some protocol addition or extension is required. The protocol modification can be done on a proprietary basis if the vendor provides both the radio access network (RAN) and the TCP sender (e.g., web server). Otherwise, some standardization would be required.

Figure 10:
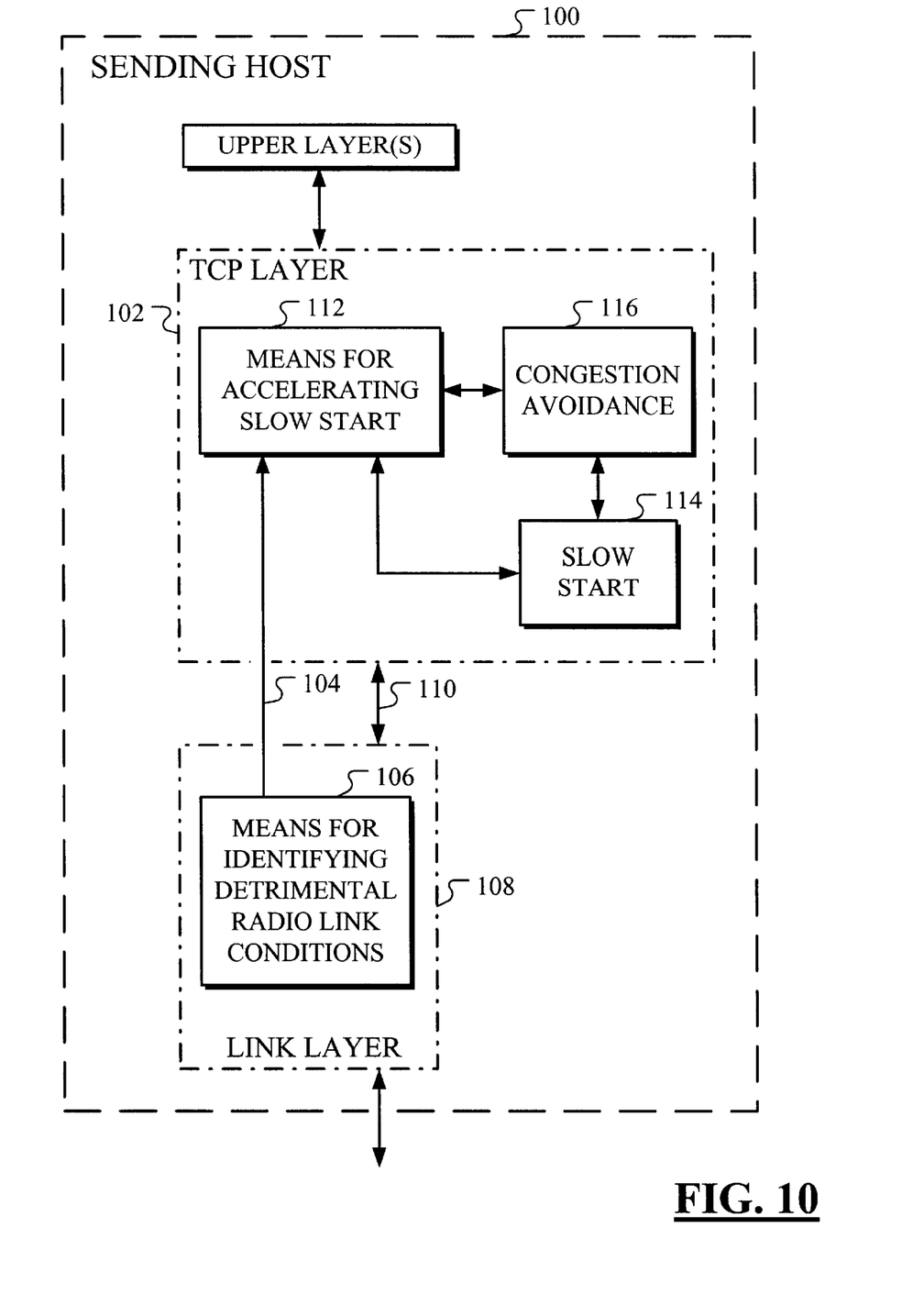
FIG. 10 shows a sending host, whether it be the mobile host or network host of FIG. 3, according to the present invention.

FIG. 10 shows a sending device 100, whether it be the mobile host or network host of FIG. 3, according to the present invention. This sending host is able to recover from a condition of packet delay or a deliberate suspension of packet traffic existing in a connection between the sending device and the receiver. Such a condition of packet delay may be of the type interpreted by the Internet protocol designers as being caused by congestion. The response of the TCP application is to avoid such perceived congestion by the related techniques of slow-start and multplicative decrease, as explained previously. Or, a complete stoppage may be due to the GPRS suspend state referred to previously. The present invention recognizes that a wireless link such as the wireless link 32 of FIG. 3 can introduce errors much more frequently than in the typical wired network shown in FIG. 1. Therefore, instead of using the slow-start procedure presently in use for TCP/IP, the present invention uses a modified slow-start which accelerates the slow-start process in the presence of one or more detrimental radio link conditions. This means, as shown in FIG. 10, that a TCP layer 102 in the sending host 100 receives a signal indication of the existence of a detrimental radio link condition in the connection, e.g., on a line 104 from a means 106 for identifying such detrimental radio link condition. If the sending host is a mobile host 30 such as shown in FIG. 3, such means for identifying a detrimental radio link condition may be located entirely within the mobile host 30 itself, e.g., at a link layer 108 thereof which is in communication with the TCP layer on a line 110 as well as the line 104. On the other hand, if the sending host is not a mobile host, such as the network host 40 shown in FIG. 3, then the means for identifying a detrimental radio link condition may be located elsewhere such as shown previously in connection with FIGS. 5–9. In that case, a proprietary solution is more difficult and standardization changes may be required, as also explained above.

In any event, the TCP layer 102 of FIG. 10 includes, according to the present invention, means 112 responsive to the signal on the line 104 for accelerating the slow-start procedure of the prior art, as explained above in connection with FIG. 4. It should be realized that the TCP layer 102 also includes a means 114 for carrying out the slow-start procedure of the prior art, in case the means for identifying detrimental radio link conditions 106 does not provide an indication thereof on the line 104. In that case, the slow-start procedure of the prior art (RFC 2001) as carried out by the means 114 is still appropriate. The TCP layer 102 will also include congestion avoidance means 116 according to the prior art for carrying out the multiplicative decrease technique that is used for congestion avoidance according to the prior art, e.g., upon loss of a segment, the congestion window is reduced by half (down to a minimum of at least one segment) or, according to the present invention, by, for example, 1/(k+1), depending on whether the signal on line 104 is asserted. For those segments that remain in the allowed window, the transmission timer is backed off exponentially.

It will therefore be realized that FIG. 10 shows a sending device 100 that includes means 106 for identifying a period of a detrimental radio condition existing on a radio link of a connection, means 112 for accelerating the slow start of the prior art after a period of such a detrimental radio condition existing on a radio link of the connection concurrent with the period of packet delay existing in the connection and congestion avoidance means 116 modified to reduce the window by 1/(k+1) and not by ½ as in the case of a prior art slow start.

The various functional blocks shown in FIG. 10 will normally be carried out in software coded and stored in a memory within the device 100. Such code will carry out routines such as the steps shown in FIG. 4 to carry out the steps shown. Thus, it will be realized that the means 112 for accelerating the slow start will normally be carried out in software which is able to execute steps for starting the congestion window at a size (k) greater than a single segment, such as shown in FIG. 4, step 46. And the means 112 will also constitute means for increasing the congestion window by the size k which is greater than a single segment each time an acknowledgement arrives, as per step 60 of FIG. 4. Likewise, the means 112 is coded in such a way as to constitute means for carrying out the step 62 of FIG. 4 for ceasing the increasing of the congestion window upon the congestion window reaching a size equal to the receiver's advertised window or a size equal to a slow start threshold size or some other threshold. After reaching such a threshold, the means 112 may be coded so as to constitute means for increasing the congestion window linearly instead of exponentially between the slow start threshold size and the advertised window size of the receiver. It should also be realized that the means 112 may also be coded so as to react to a GPRS suspend state by accelerating slow start after a period of deliberate suspension of service over the connection between the sending device and the receiver.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Method, for increasing traffic from a sender (30) to a receiver (40) in a communications system after a period of packet delay or loss existing in a connection between said sender and said receiver by starting a congestion window (cwnd) and increasing the congestion window each time an acknowledgement arrives, characterized by said sender accelerating said starting after a period of a detrimental radio condition existing on a radio link (32) of said connection concurrent with said period of packet delay or loss existing in said connection.

2. The method of claim 1, characterized by said sender accelerating said starting by at least one of:
   (a) starting said congestion window at a first size (m) greater than a single segment, and
   (b) increasing said congestion window by a second size (k) greater than a single segment each time an acknowledgement arrives.

3. The method of claim 2, characterized by
   (c) ceasing said increasing said congestion window by said second size (k) greater than a single segment upon said congestion window reaching a size equal to a slow-start threshold size (ssthresh).

4. The method of claim 2, characterized by
   (c) ceasing said increasing said congestion window by said second size (k) greater than a single segment upon said congestion window reaching a size equal to or greater than a slow start threshold size (ssthresh).

5. The method of claim 4, characterized by
   (d) transitioning from said sender accelerating said starting to a congestion avoidance procedure.

6. The method of claim 1, characterized by said sender accelerating said starting after a period of deliberate suspension of service over said connection between said sender and said receiver.

7. The method of claim 1, characterized by said receiver comprising a mobile host (MS), and by signaling existence of said detrimental radio condition from said mobile host to said sender.

8. The method of claim 1, characterized by said receiver comprising a mobile host (MS), and by signaling existence of said detrimental radio condition from a radio access network (RAN) to said sender.

9. The method of claim 1, characterized by said receiver comprising a mobile host (MS), by signaling existence of said detrimental radio condition from a radio access network (RAN) to said mobile host, and by signaling from said mobile host to said sender via said RAN.

10. The method of claim 1, characterized by said sender accelerating said starting by increasing said congestion window by a size (k) greater than a single segment each time an acknowledgement arrives and by dividing the congestion window by a factor (L) upon a timeout or packet loss to obtain a reduced slow-start threshold indicative of a point at which a transition from said accelerating said startup to congestion avoidance is needed.

11. Sending device able to recover from a condition of packet delay or loss existing in a connection between said sending device and a receiver by starting a congestion window at a selected size and increasing the congestion window each time an acknowledgement arrives, said sending device characterized by
   means for identifying a period of detrimental radio conditions existing on a radio link of said connection, and by
   means for accelerating said starting after a period of detrimental radio conditions existing on said radio link (32) of said connection concurrent with said period of packet delay or loss existing in said connection.

12. The means for accelerating said slow start of claim 11, characterized by at least one of:
   (a) means for starting said congestion window at a first size (m) greater than a single segment, and
   (b) means for increasing said congestion window by a second size (k) greater than a single segment each time an acknowledgement arrives.

13. The means for accelerating said slow start of claim 12, characterized by
   (c) means for ceasing said increasing said congestion window by said second size (k) greater than a single segment upon said congestion window reaching a size equal to a slow-start threshold size.

14. The means for accelerating said slow start of claim 12, characterized by
   (c) means for ceasing said increasing said congestion window by said second size (k) greater than a single segment upon said congestion window reaching a size equal to or greater than a slow start threshold size.

15. The means for accelerating said slow start of claim 14, characterized by
   (d) means for transitioning from said sender accelerating said starting to a congestion avoidance procedure.

16. The sending device of claim 11, characterized by said means for accelerating said starting after a period of deliberate suspension of service over said connection between said sending device and said receiver.

17. The sending device of claim 11, characterized by said receiver comprising a mobile host (MS), and by said mobile host signaling said sending means said existence of said detrimental radio conditions.

18. The sending device of claim 11, characterized by said receiver comprising a mobile host (MS), and by the existence of said detrimental radio conditions signaled from a radio access network (RAN) to said sending device.

19. The sending device of claim 11, characterized by said receiver comprising a mobile host (MS), by signaling existence of said detrimental radio conditions from a radio access network (RAN) to said mobile host, and by signaling from said mobile host to said sending device via said RAN.

20. The sending device of claim 11, characterized by said receiver comprising a mobile host (MS), by existence of said detrimental radio conditions signaled from a radio access network (RAN) to said mobile host, and by said existence of said detrimental radio conditions signaled from said mobile host to said sending device via said RAN.

21. The sending device of claim 11, characterized by means for said sender to accelerate said starting by increasing said congestion window by a size (k) greater than a single segment each time an acknowledgement arrives and by means for dividing the congestion window by a factor (L) upon timeout or packet loss to obtain a reduced slow start threshold indicative of a point at which a transition from said accelerating said starting to congestion avoidance is needed.

22. Communications system comprising a plurality of hosts able to communicate with datagrams sent via a network in between the hosts, wherein a sending host increases traffic to a receiving host after a period of packet delay or loss existing in a connection between said sending host and said receiving host by starting a congestion window at a selected size and increasing the congestion window each time an acknowledgement arrives from the receiving host, characterized by
   said sending host having means for accelerating said starting after a period of a detrimental radio condition existing on a radio link (32) of said connection concurrent with said period of packet delay or loss in said connection.

23. The system of claim 22, characterized by said sending host accelerating said starting after a period of deliberate suspension of service over said connection between said sending host and said receiving host.

24. The system of claim 22, characterized by said receiving host comprising a mobile host (MS), and by means for signaling existence of said detrimental radio condition from said mobile host to said sending host.

25. The system of claim 22, characterized by said receiving host comprising a mobile host (MS), and by means for signaling existence of said detrimental radio condition from a radio access network (RAN) to said sending host.

26. The system of claim 22, characterized by said receiving host comprising a mobile host (MS), and by means for signaling existence of said detrimental radio condition from a radio access network (RAN) to said mobile host, and by means for signaling from said mobile host to said sending host via said RAN.

\* \* \* \* \*

UNITED STATES PATENT AND TRADEMARK OFFICE
CERTIFICATE OF CORRECTION

PATENT NO. : 6,744,730 B2
DATED : June 1, 2004
INVENTOR(S) : Khiem Le and Yogesh Swami

It is certified that error appears in the above-identified patent and that said Letters Patent is hereby corrected as shown below:

Drawings,
Figure 4, in the decision box number 54, please delete "ACT" and substitute -- ACK --.

Please see the attached sheet 3/5, Figure 4 of the drawings that was submitted by amendment on July 14, 2003 with the correction indicated above.

Signed and Sealed this

Eighth Day of February, 2005

JON W. DUDAS
*Director of the United States Patent and Trademark Office*

FIG. 4